US012639029B1

(12) United States Patent
Ye et al.

(10) Patent No.: US 12,639,029 B1
(45) Date of Patent: May 26, 2026

(54) SHUTTER GLASSES-BASED SYSTEM FOR MASSIVE SPHERICAL DISPLAY

(71) Applicant: Sony Interactive Entertainment Inc., Tokyo (JP)

(72) Inventors: Xiaoyong Ye, San Mateo, CA (US); Mario Sarria, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 18/963,365

(22) Filed: Nov. 27, 2024

(51) Int. Cl.
*G06F 3/14* (2006.01)
*G02B 30/24* (2020.01)

(52) U.S. Cl.
CPC ........... *G06F 3/1454* (2013.01); *G02B 30/24* (2020.01)

(58) Field of Classification Search
CPC combination set(s) only.
See application file for complete search history.

(56) References Cited

U.S. PATENT DOCUMENTS

| | | | |
|---|---|---|---|
| 2014/0063061 A1* | 3/2014 | Reitan | G09G 5/14 |
| | | | 345/633 |
| 2015/0254882 A1* | 9/2015 | Englert | G02B 27/017 |
| | | | 345/633 |
| 2018/0270464 A1* | 9/2018 | Harviainen | H04N 13/344 |
| 2022/0407902 A1* | 12/2022 | Rubin | H04N 7/152 |

* cited by examiner

*Primary Examiner* — William Boddie
*Assistant Examiner* — Alecia D English
(74) *Attorney, Agent, or Firm* — Kilpatrick Townsend & Stockton LLP

(57) ABSTRACT

In one aspect, transparent headset displays and a massive spherical display may be used together for enhanced content rendering to provide an immersive technological experience. Thus, while users sit inside the spherical display, extended reality (XR) content may be presented on the users' headsets in conjunction with other content that is presented on the inside of the spherical display itself. Additionally, the transmissivity of the headset displays can be synced by frequency with different layers of the spherical display so that naked-eye viewers see one image on a nearest layer of the spherical display while headset viewers see another image presented on another layer of the spherical display that is farther away from the viewers.

19 Claims, 4 Drawing Sheets

Inset A

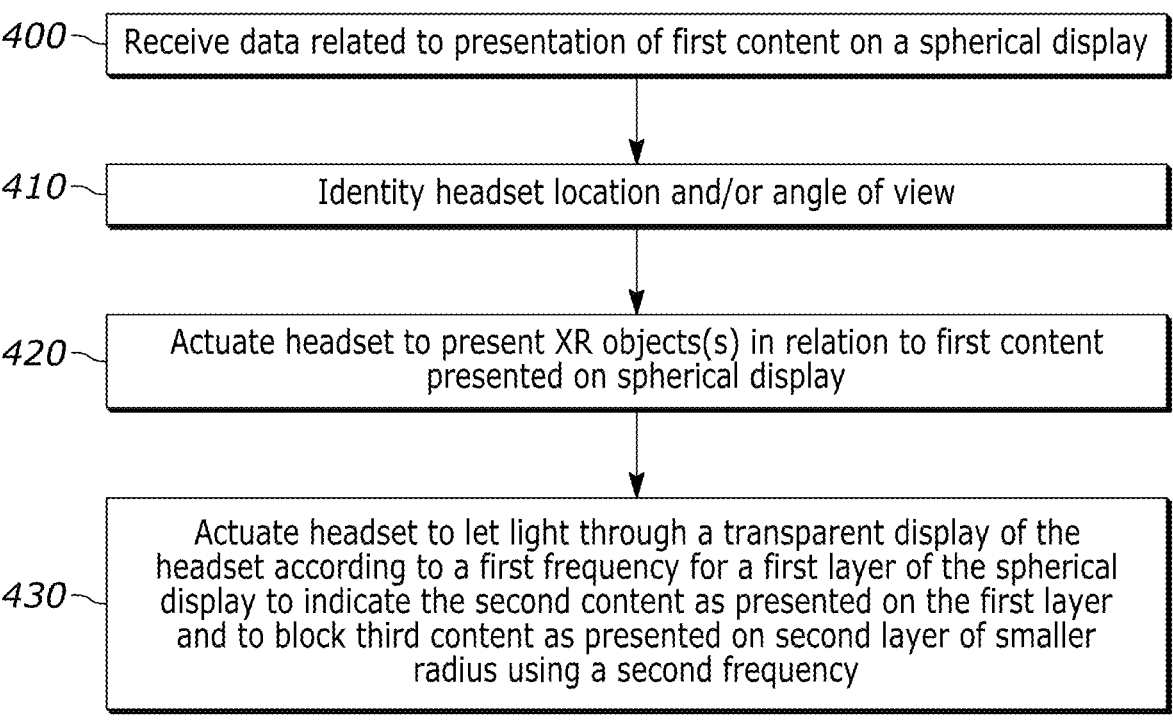

400 — Receive data related to presentation of first content on a spherical display 410 — Identity headset location and/or angle of view 420 — Actuate headset to present XR objects(s) in relation to first content presented on spherical display 430 — Actuate headset to let light through a transparent display of the headset according to a first frequency for a first layer of the spherical display to indicate the second content as presented on the first layer and to block third content as presented on second layer of smaller radius using a second frequency

FIG. 4

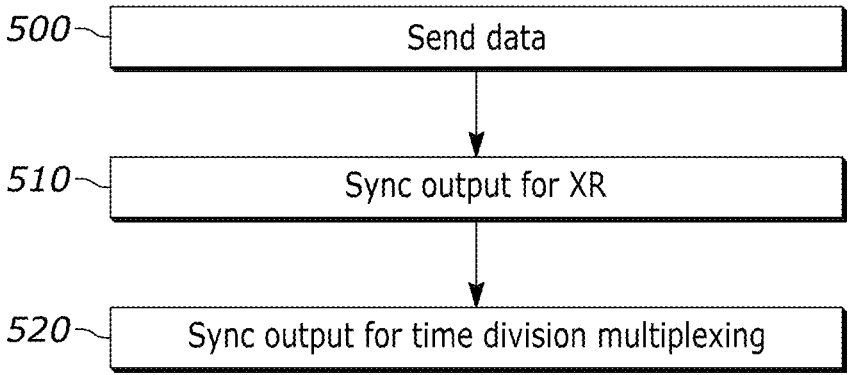

500 — Send data

510 — Sync output for XR

520 — Sync output for time division multiplexing

FIG. 5

SHUTTER GLASSES-BASED SYSTEM FOR MASSIVE SPHERICAL DISPLAY

FIELD

The disclosure below relates to technically inventive, non-routine solutions that are necessarily rooted in computer technology and that produce concrete technical improvements. In particular, the disclosure below relates to a shutter glasses-based system for massive spherical displays.

BACKGROUND

Massive spherical displays have been developed recently. These types of displays allow spectators to sit inside the spherical display in stadium-type seating to watch concerts and other forms of entertainment taking place onstage inside the spherical display. Additionally, while the concert is ongoing, the spherical display itself may present digital content to the spectators inside owing to its display surface facing inward toward the spectators.

However, present principles recognize that spherical display hardware and operation is still somewhat limited and that further technical improvements can be realized to improve the functioning and technical capabilities of the system itself.

SUMMARY

Accordingly, in one aspect an apparatus includes at least one processor system configured to receive data related to presentation of first content on a spherical display. The at least one processor system is also configured to, based on the data, actuate a headset to indicate second content associated with the spherical display.

In some example implementations, the data may be related to one or more extended reality (XR) objects to present at the headset. Here the at least one processor system may be configured to actuate the headset to present the one or more XR objects in relation to the first content presented on the spherical display, with the one or more XR objects establishing the second content. In some non-limiting instances, the at least one processor system may even be configured to identify a location of the headset in relation to the spherical display and, based on the location of the headset, present the one or more XR objects at the headset and in relation to the first content presented on the spherical display. In one particular instance, the at least one processor system may be configured to identify the location of the headset in relation to a surface of the spherical display that faces inward toward seating inside the spherical display.

Also in some example implementations, the at least one processor system may be configured to actuate the headset to let light through a transparent display of the headset according to a first frequency for the spherical display to indicate the second content as presented on the spherical display. The data may therefore also indicate the first frequency, and the second content may be the same as the first content. In some specific examples, the second content may be presented on a first layer of the spherical display, the first frequency may be associated with the first layer, and the at least one processor system may be configured to actuate the headset according to the first frequency to block light emanating from a second layer of the spherical display according to a second frequency for the second layer. The second frequency may therefore be different from the first frequency. And in some specific non-limiting embodiments, the first and second layers may be spherical layers, with the first layer having a larger radius than the second layer. Additionally, if desired, the second frequency may be faster than the first frequency.

Also in example implementations, the apparatus may include the headset and/or the spherical display itself.

In another aspect, a method includes receiving, at a headset, data related to presentation of first content on a spherical display. The method also includes, based on the data, actuating a transparent display of the headset to indicate second content associated with the spherical display.

In some example implementations, the method may therefore include identifying an angle of view from the headset toward a first object presented on the spherical display and, based on the angle of view, presenting a second object on the transparent display in relation to the first object. If desired, the second object may include an extended reality (XR) object presented on the transparent display to appear in three dimensional (3D) space in relation to the first object.

Also in some example implementations, the second content may be the first content, and the data may include time division multiplexing data. Here, the method may include actuating, according to the time division multiplexing data, the transparent display to let light through according to a first frequency for a first layer of the spherical display to thus indicate the second content as presented on the first layer of the spherical display. Also according to these implementations, in some cases the method may also include actuating, according to the time division multiplexing data, the transparent display to block viewing through the transparent display of third content presented on a second layer of the spherical display. The third content may be presented according to a second frequency for the second layer, with the second frequency being faster than the first frequency.

In still another aspect, an apparatus includes at least one computer readable storage medium (CRSM) that is not a transitory signal. The at least one CRSM includes instructions executable by a processor system to receive, at a headset, data related to presentation of first content on an inward-facing surface of a spherical display. The instructions are also executable to, based on the data, actuate a transparent display of the headset to indicate second content associated with the spherical display.

In some example implementations, the instructions may be executable to use headset location and angle of view inside the spherical display to present one or more extended reality (XR) objects on the transparent display to appear as though interacting with the first content as presented on the inward-facing surface of the spherical display.

Also in some example implementations, the inward-facing surface may be a first inward-facing surface, and the instructions may be executable to operate the transparent display to block viewing of the first content as presented on the first inward-facing surface and to enable viewing of the second content as presented on a second inward-facing surface of the spherical display. The second inward-facing surface may have a larger radius than the first inward-facing surface.

The details of the present application, both as to its structure and operation, can be best understood in reference to the accompanying drawings, in which like reference numerals refer to like parts, and in which:

BRIEF DESCRIPTION OF THE DRAWINGS

FIG. 4 shows example logic in example flow chart format that may be executed by a headset consistent with present principles; and FIG. 5 shows example logic in example flow chart format that may be executed by a spherical display system consistent with present principles.

DETAILED DESCRIPTION

Figure 1:
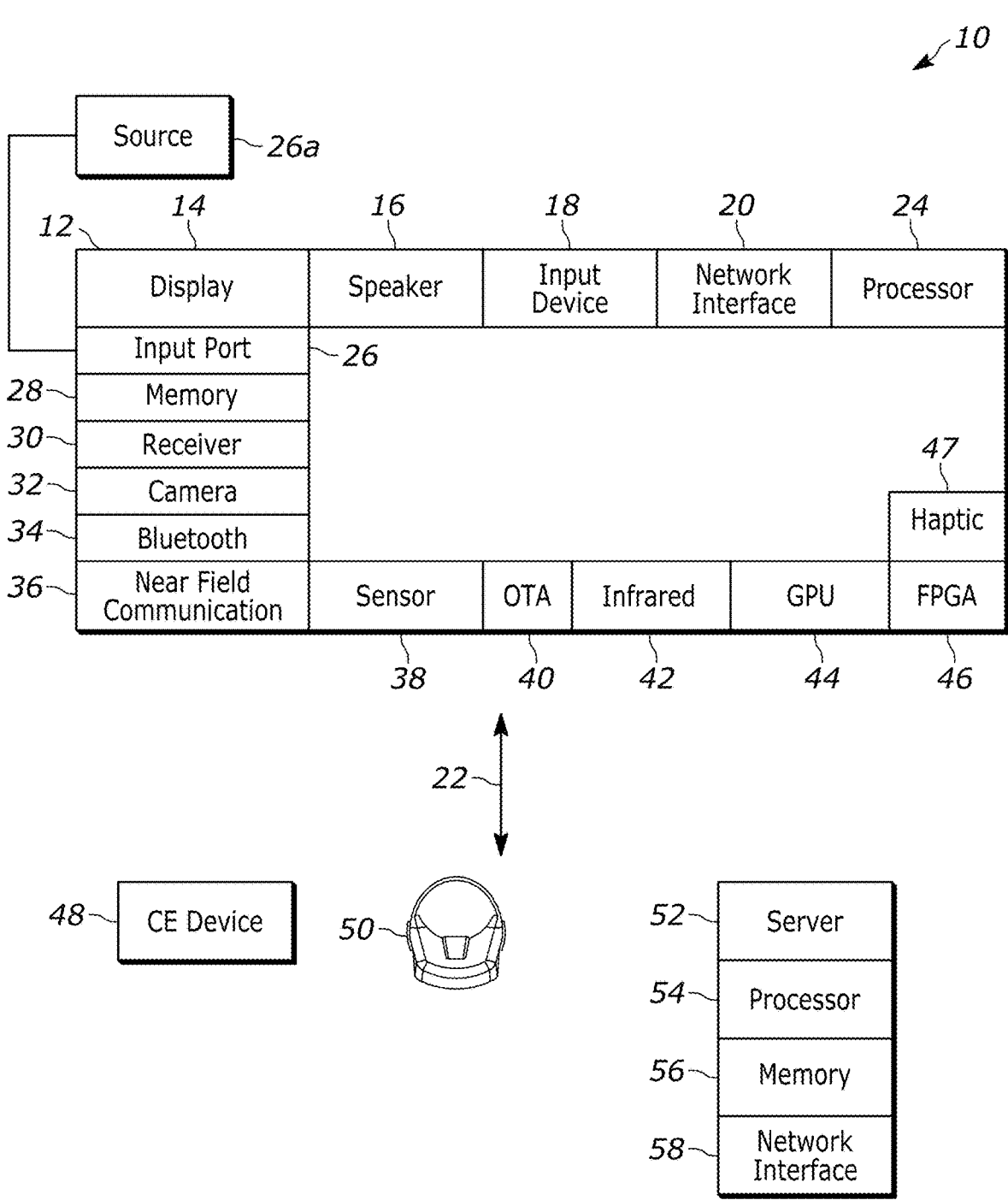
FIG. 1 is a block diagram of an example system consistent with present principles.

The detailed description below provides technical systems and methods for using headsets in conjunction with massive spherical displays like the Las Vegas Sphere. In one aspect, AR glasses may be used with the massive display, thereby combining a personal display with a massive-scale display. Personal augmented reality (AR) glasses may be synched with the massive display so that supplemental AR content can be created and presented at the headset in 3D based on the user's viewing angle toward the massive display. In some specific examples, a static scene might be displayed on the massive display while personalized and dynamic content is presented on the AR glasses.

Additionally or alternatively, the AR glasses may be used with the spherical globe display where the spherical globe display has multiple display layers (discrete layered displays of increasing radii). The AR glasses may therefore be used as shutter glasses for spectators, opening and closing their light transmissivity using different frequencies to present different images from the different layers. Thus, one layer's content might only be visible using the AR glasses while another layer's content is visible to unaided eyes to avoid flashing screens where the naked-eye user might otherwise notice content on both layers. Showing different content in different layers but still generally in the same large area within the sphere itself therefore provides technical improvements in the tuning of content based on the specific viewer during concurrent content rendering.

As one particular example, naked-eye content presented on an inner-most, inward-facing display surface may be G-rated content for all-ages viewing, while supplemental AR content with a higher rating of PG-13 may be presented on another layer of the sphere behind the inner-most layer (more external than the inner-most layer). The higher-rated content may then be viewed using a headset.

The lack of flickering enabled by present principles may also advantageously allow those with epilepsy to safely view the content on the inner-most surface with the naked eye without triggering an epileptic episode.

Additionally, note that the term spherical as used below does not necessarily have to correlate to a complete sphere in all circumstances. Rather, in some examples, a spherical surface or object may be semi-spherical in shape but still generally spherical (just as the Las Vegas Sphere itself is not a complete sphere though still spherical in shape).

With the foregoing in mind, it is to be understood that this disclosure relates generally to computer ecosystems including aspects of consumer electronics (CE) device networks such as but not limited to computer game networks. A system herein may include server and client components which may be connected over a network such that data may be exchanged between the client and server components.

The client components may include one or more computing devices including game consoles such as Sony PlayStation® or a game console made by Microsoft or Nintendo or other manufacturer, extended reality (XR) headsets such as virtual reality (VR) headsets and augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry. A processor system may include one or more processors acting independently or in concert with each other to execute an algorithm, whether those processors are in one device or more than one device.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

The term "a" or "an" in reference to an entity refers to one or more of that entity. As such, the terms "a" or "an", "one or more", and "at least one" can be used interchangeably herein.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12 consistent with present principles. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, global positioning system (GPS) receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer/video game audio and video to the AVD 12 via commands sent directly to the AVD 12 and/or through the below-described server, while a second CE device 50 may include similar components as the first CE device 48. The CE device 48 might additionally or alternatively be configured as a computer game controller manipulated by a player, or another CE device may be established as such.

Also in the example shown, the second CE device 50 may be a head-mounted display (HMD) worn by a player. The HMD may include a heads-up transparent or non-transparent display for respectively presenting AR content, mixed reality (MR) content, and/or virtual reality (VR) content (more generally, extended reality (XR) content). The HMD may be configured as a glasses-type display (e.g., smart glasses) or as a head-circumscribing AR or VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components discussed in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Generative pre-trained transformers (GPTT) also may be used. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that are configured and weighted to make inferences about an appropriate output.

Figure 2:
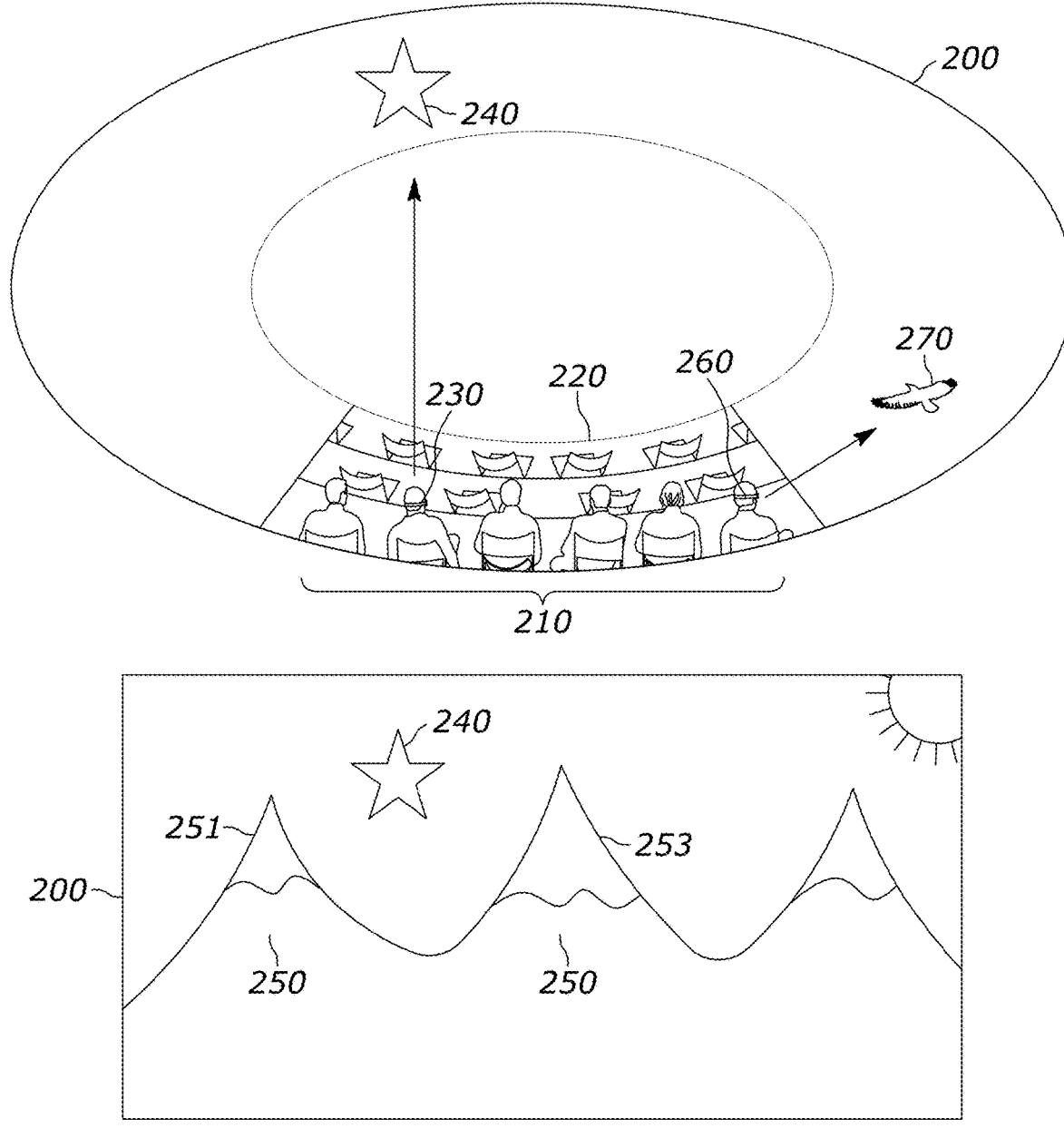
FIG. 2 shows a simplified perspective view of people sitting inside a spherical display system to view XR content consistent with present principles.

Now in reference to FIG. 2, a simplified perspective view is shown of a massive spherical display 200 that may surround stadium seats 210 that are located inside the spherical display 200. The spherical display may be similar to the Las Vegas Sphere in some example embodiments. Different people 220 may sit in different seats 210, and one or more of the people 220 may wear a respective XR headset to view content at the headset that is supplemental to the content presented on an inside surface of the spherical display 200 itself (the inside surface facing the people 220 for viewing from inside the spherical display 200).

As such, one of the people 220 may be wearing a first XR headset 230 to view an XR object in the form of a star 240 that is presented on the transparent display of the headset 230 to appear in three dimensional (3D) real space in relation to another object(s) that is presented on an inward-facing display surface of the spherical display 200 itself. Inset A of FIG. 2 shows the view of the respective person 220 through the display of the headset 230 while looking straight ahead in front of them at virtual mountains 250 that are presented on the spherical display 200 beyond the transparent display itself. Note that the star 240 is therefore presented using stereoscopic image rendering to appear as though located in real-world 3D space in relation to the location of two mountain tops 251, 253 presented on the spherical display.

FIG. 2 also illustrates that at the same time the star 240 is presented at the headset 230, another headset 260 of another respective person 220 may present a different XR object 270 at the transparent display of the headset 260 to still appear in 3D real space in relation to the content presented on the spherical display 200 itself. In the present example, the object 270 includes a virtual phoenix.

Thus, note that while the seats 210 might all face the same general direction within the spherical display 200, the viewing angles and locations of the headsets 230, 260 are different. As such, different XR objects may be viewed for the same overall XR scene that is presented on the spherical display 200, as dependent on headset location and viewing angle as well as possibly the content preferences that are set for the individual headset user themselves.

The XR experience delivered to each headset user may therefore use both XR content presented at the headset and supporting XR content that is presented panoramically across some or all of the spherical display 200 for an immersive viewing experience. The supporting content itself may be static with the XR content presented at the headset interacting with the static content, or may be dynamic so that the XR content presented at the headset can sync with the supporting content as it moves on the spherical display 200 to dynamically interact with the supporting content. In either case, it may be appreciated that this experience may provide immersive XR imagery using both displays.

Figure 3:
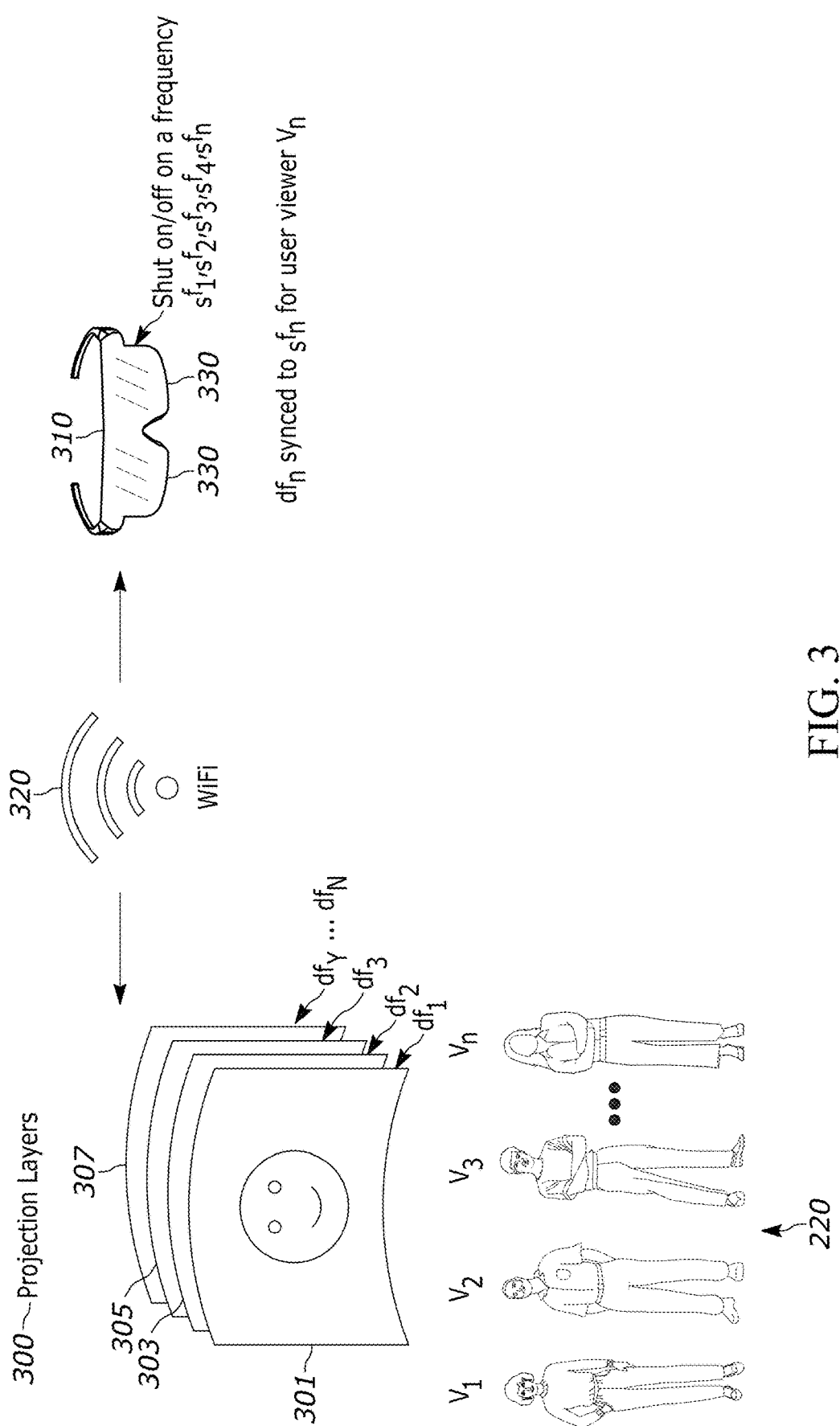
FIG. 3 shows an example schematic diagram of the multiple layers of a spherical display system consistent with present principles, and also illustrates use of the different layers to present different content at different frequencies.

FIG. 3 shows a schematic diagram of additional technology that may be implemented for an immersive spherical display experience consistent with present principles. The technology of FIG. 3 may be combined with, or used independently of, the technology of FIG. 2.

FIG. 3 illustrates that the spherical display 200 of FIG. 2 may have multiple transparent display layers 300 that each face inward toward the center and/or inside floor of the spherical display 200 for viewing by viewers 220 on the floor. Each layer 300 may be established by its own transparent organic light-emitting diode (OLED) display (or other suitable transparent display type). Each layer 300 may therefore establish an inward-facing display surface, with the layers 300 being nested before/after another respective layer 300. Each layer 300 may therefore present its own images/video independently of other layers 300, with the layers 300 having increasing radii as they progress from an inner-most layer 301 to an outer-most layer 307.

Additionally, each layer 300 may present images and video using its own frequency or refresh rate, with inner layers 300 closer to the people 220 presenting content at a faster frequency than outer layers 300 farther away from the geometric center of the spherical display 200. Thus, the inner-most layer 301 may have a refresh rate $df_1$ (e.g., 60 Hz) while the next inner-most layer 303 may have a slower refresh rate of $df_2$ (e.g., 30 Hz). Subsequent layers 305, 307 may have even slower refresh rates of $df_3$ and $df_4$ (e.g., 15 Hz). These progressively decreasing display frequencies allow first content 310 that is presented on the inner-most layer 301 to dominate the vision of a naked-eye person 220 so that the same person 220 would have difficulty seeing, or be unable to see, content presented on the layers 303-307 at different times (through time-division multiplexing at slower refresh rates). The faster refresh rate of the first layer 301 may therefore prevent a flickering effect on the naked eye.

However, certain people (viewers) 220 inside the display 200 may wear a respective headset 310, each of which may be in wireless communication with the display 200 over Wi-Fi 320 or other wireless communication. Each headset 310 may have its own transparent OLED display 330 that can transition between transparent and opaque at a respective shutter frequency $sf_n$ that corresponds to a respective frequency $df_n$ of one of the layers 303-307. And since each of the frequencies $df_{1-n}$ is offset from the other frequencies $df_{1-n}$ in the time domain such that only one of the layers 301-307 presents content at any given time, each headset 310 may time the transitioning of its display 330 to transparent at the assigned shutter frequency $sf_n$ for content of the respective layer 303-307 to be shown through the headset display 330. The same headset 210 may also time its display 330 to transition to opaque during other times at which other layers 301-307 are presenting content. Accordingly, it is to be understood that a spherical layer display frequency $df_n$ may be synchronized to a headset shutter frequency $sf_n$ for a respective viewer $v_n$.

With FIG. 3 in mind, it is to be understood that in one particular example, the four people 220 shown may each have a headset using a higher screen refresh rate to further provide different viewing experiences. Thus, if the total refresh rate for all four screens was 120 hz, the system may dedicate 30 hz per view (for four different streams to be viewed) and tune the respective glasses to the respective timing. The frames themselves would be interleaved accordingly. And considering that movies (in a movie theatre) are shown at 24 frames per second, for such an embodiment there may be six frames available for any overhead encountered when sync'ing glasses.

Continuing the detailed description in reference to FIG. 4, this figure shows example logic that may be executed by an apparatus such as a client device (e.g., headset and/or smartphone) and/or coordinating server alone or in any appropriate combination consistent with present principles. Thus, in some examples the logic may be executed by a client device alone. In other examples, the logic may be executed by the remotely-located server alone. In still other examples, the logic may be executed by a client device and remotely-located server, where the client device performs some steps while the server performs other steps, and/or where the client device and server work together to perform a given step. Note that while the logic of FIG. 4 is shown in flow chart format, other suitable logic may also be used.

Beginning at block 400, the apparatus may receive data related to presentation of first content on a spherical display. The data that is received at block 400 may include XR data, including image data for XR objects to present at the headset, 3D location data for the XR object(s), and respective times/durations at which to present the XR objects in conjunction with the (different) content presented on the spherical display.

Additionally or alternatively, the data received at block 400 may include time division multiplexing data indicating a first frequency and times/intervals at which the shutter displays of the headset are to be rendered transparent to sync with a frequency of one of the spherical display's non-inner-most, independent display layers to show the respective content of that layer while blocking out the content of other layers as presented at other times of day.

From block 400 the logic may then proceed to block 410. At block 410 the apparatus may identify a location of the headset in relation to the spherical display (e.g., in relation to the surfaces/layers of the spherical display that face inward toward seating inside the spherical display). Also at block 410, the apparatus may identify a current angle of view from the headset toward a first object presented on one of the layers of the spherical display.

Headset location may be identified through GPS coordinates using a GPS transceiver on the headset. Additionally or alternatively, headset location may be identified through camera-based localization techniques using a camera on the headset and computer vision. Headset angle of view may also be determined using video from the headset camera and computer vision. Additionally or alternatively, headset angle of view may be determined using data from a motion sensor on the headset (e.g., accelerometer, gyroscope, and/or magnetometer).

From block 410 the logic may then proceed to block 420. At block 420 based on the identified location and angle of view of the headset, the apparatus may actuate the headset's transparent display to present the one or more XR objects at the headset and in relation to the first content (e.g., graphical objects) presented on one of the layers of the spherical display (such as the inner-most layer).

From block 420 and during the same (or different) event or content presentation at the spherical display, the logic may move to block 430. At block 430 the apparatus may use the time division multiplexing data received at block 400 to actuate the transparent display of the headset to let light through the transparent display according to a first frequency $sf_n$ for the spherical display to indicate content presented on another layer of the spherical display as synced with the respective refresh rate $df_n$ for that layer. Similarly, the apparatus may also actuate the transparent display of the headset at block 430 to block light emanating from other layers of the spherical display at other times according to respective other frequencies $df_{1-n}$ for those layers.

Again note that different spherical layers of the spherical display may have different frequencies/refresh rates. The layers with the larger radii may be used to indicate content at the headset itself that is presented on one of those layers using time division multiplexing. But the inner-most layer (smallest radius) may still present other content at the highest frequency/refresh rate so that naked-eye viewers can see the high-frequency content without appreciating that other content is being presented behind the inner-most layer using the other (larger) spherical layers.

Continuing the detailed description in reference to FIG. 5, it shows example logic that may be executed to control a spherical display consistent with present principles. Beginning at block 500, the spherical display may send data to one or more headsets in communication with the spherical display. The data that is sent at block 500 may be the same data received at block 400 as described above (e.g., both XR object rendering data and time division multiplexing data).

From block 500 the logic may then proceed to block 510. At block 510 the spherical display may synchronize its display output frequency for its inner-most layer with the headset displays to present base XR content consistent with the XR and timing data that it sent to the headsets for individual XR object rendering at the headsets. The logic may then proceed to block 520.

At block 520 the spherical display may synchronize its respective display output frequencies for its non-inner-most layers with the headset displays according to the time division multiplexing data that was sent to the headsets so that the transparent headset displays can show respective content from a designated layer using a designated shutter rate that is synced up to the frequency and timing of the content being rendered on the designated layer itself.

It may now be appreciated that an AR globe may be brought to the user's eyes and world through a combination of mass displays and AR glasses.

One example system may incorporate a dual-layer display system housed in a large, globe-shaped screen. The system may display layered content, controlled by frequency modulation, where each layer is viewable only by designated viewers through frequency-tuned shutter glasses. Each set of glasses may synchronize with specific frequencies, allowing precise control over content visibility. For instance, layer #1 may display content for viewers without glasses, while layer #2 may be synchronized to shutter glasses to show a different set of images or videos to viewers wearing the glasses.

The following technologies may be used to realize present principles in non-limiting embodiments. First, a frequency control system may utilize a frequency-based or invisible light filtering method to alternate content visibility without causing interference or flashing for those without glasses. Second, a dual-layer content display may be used, where each content layer may be independently programmable to allow for customized imagery per audience group, based on frequency assignment. Third, targeted applications may be used, and here this approach enables customized viewing experiences in shared spaces where differentiated content may be shown for varied demographics or sensitive audiences (e.g., using XR objects).

Present principles may therefore help solve the challenge of displaying multiple content types within a single visual field without causing a disturbance to unintended viewers. It may be particularly valuable in mixed-audience environments where content segregation is desired, allowing audiences with different viewing requirements or sensitivities to experience appropriate content without visual disruption.

While the particular embodiments are herein shown and described in detail, it is to be understood that the subject matter which is encompassed by the present application is limited only by the claims.

What is claimed is:

1. An apparatus, comprising:
at least one processor system configured to:
receive data related to presentation of first content on a spherical display; and
based on the data, actuate a headset to indicate second content associated with the spherical display,
wherein the at least one processor system is configured to:
actuate the headset to let light through a transparent display of the headset according to a first frequency for the spherical display to indicate the second content as presented on the spherical display.

2. The apparatus of claim 1, wherein the data is related to one or more extended reality (XR) objects to present at the headset, and wherein the at least one processor system is configured to:
actuate the headset to present the one or more XR objects in relation to the first content presented on the spherical display, the one or more XR objects establishing the second content.

3. The apparatus of claim 2, wherein the at least one processor system is configured to:
identify a location of the headset in relation to the spherical display; and
based on the location of the headset, present the one or more XR objects at the headset and in relation to the first content presented on the spherical display.

4. The apparatus of claim 3, wherein the at least one processor system is configured to:
identify the location of the headset in relation to a surface of the spherical display that faces inward toward seating inside the spherical display.

5. The apparatus of claim 1, wherein the data indicates the first frequency, and wherein the second content is same as the first content.

6. The apparatus of claim 5, wherein the second content is presented on a first layer of the spherical display, wherein the first frequency is associated with the first layer, and wherein the at least one processor system is configured to:
actuate the headset according to the first frequency to block light emanating from a second layer of the spherical display according to a second frequency for the second layer, the second frequency being different from the first frequency.

7. The apparatus of claim 6, wherein the first and second layers are spherical layers, the first layer having a larger radius than the second layer.

8. The apparatus of claim 7, wherein the second frequency is faster than the first frequency.

9. The apparatus of claim 1, comprising the headset.

10. The apparatus of claim 9, comprising the spherical display.

11. A method, comprising:
receiving, at a headset, data related to presentation of first content on a spherical display; and
based on the data, actuating a transparent display of the headset to indicate second content associated with the spherical display, and
actuating the headset to let light through a transparent display of the headset according to a first frequency for the spherical display to indicate the second content as presented on the spherical display.

12. The method of claim 11, comprising:

identifying an angle of view from the headset toward a first object presented on the spherical display; and based on the angle of view, presenting a second object on the transparent display in relation to the first object.

13. The method of claim 12, wherein the second object comprises an extended reality (XR) object presented on the transparent display to appear in three dimensional (3D) space in relation to the first object.

14. The method of claim 11, wherein the second content is the first content, wherein the data comprises time division multiplexing data, and wherein the method comprises:

actuating, according to the time division multiplexing data, the transparent display to let light therethrough according to the first frequency for a first layer of the spherical display to indicate the second content as presented on the first layer of the spherical display.

15. The method of claim 14, comprising:

actuating, according to the time division multiplexing data, the transparent display to block viewing through the transparent display of a third content presented on a second layer of the spherical display, the third content presented according to a second frequency for the second layer.

16. The method of claim 15, wherein the second frequency is faster than the first frequency.

17. An apparatus, comprising:

at least one computer readable storage medium (CRSM) that is not a transitory signal, the at least one CRSM comprising instructions executable by a processor system to:

receive, at a headset, data related to presentation of first content on an inward-facing surface of a spherical display;

based on the data, actuate a transparent display of the headset according to a first frequency for the spherical display to indicate second content associated with the spherical display.

18. The apparatus of claim 17, wherein the instructions are executable to:

use headset location and angle of view inside the spherical display to present one or more extended reality (XR) objects on the transparent display to appear as though interacting with the first content as presented on the inward-facing surface of the spherical display.

19. The apparatus of claim 17, wherein the inward-facing surface is a first inward-facing surface, and wherein the instructions are executable to:

operate the transparent display to block viewing of the first content as presented on the first inward-facing surface and to enable viewing of the second content as presented on a second inward-facing surface of the spherical display, the second inward-facing surface having a larger radius than the first inward-facing surface.

* * * * *